United States Patent Office 3,272,593
Patented Sept. 13, 1966

3,272,593
PROCESS OF REDUCING THE CAKE-FORMING TENDENCY OF POTASSIUM CHLORIDE AND COMPOSITION CONTAINING SAME
Basil S. Fee, Sarnia, Ontario, Canada, assignor to The Dow Chemical Company, Midland, Mich., a corporation of Delaware
No Drawing. Filed May 4, 1964, Ser. No. 364,774
6 Claims. (Cl. 23—89)

This invention relates to non-caking compositions of potassium chloride and to a method for the manufacture of such compositions.

It is known that polyethylene glycols with a molecular weight greater than 150 are effective agents for decreasing the tendency of ammonium sulfate to conglomerate in the presence of moisture as disclosed in Canadian Patent 566,246, issued November 18, 1958, to Dupire. Such higher molecular weight polyethylene glycols are not effective for the prevention of the undesirable caking of many other salts, however. Due to differences in the hygroscopicity and other properties of various salts, agents which may effectively prevent the caking of one material may result in liquid masses or intractable, non-friable or brick-like compositions when incorporated into other salts of similar granular size or crystalline structure. Other materials such as light fuel oil have also been used to prevent caking but these materials are not water-soluble and often have offensive odors.

It has now been found that the caking tendency of potassium chloride can be minimized by the incorporation of from about 0.05 to 0.5 percent by weight, preferably from 0.15 to 0.35 percent by weight, of diethylene glycol into the mixture based upon the total weight of the treated composition. In addition to the diethylene glycol, minor amounts (from 0.0075 percent to 0.08 percent by weight based on the total weight of the composition) of ethylene glycol may be incorporated into the composition. The use of amounts of ethylene glycol in excess of one percent by weight generally tends to increase rather than decrease the caking properties of the potassium chloride composition. Concentrations of diethylene glycol or diethylene glycol-ethylene glycol above about 4.0 percent by weight increases the caking of the KCl.

The following examples are submitted for the purpose of illustration only and are not to be construed as limiting the scope of the invention in any way.

*Examples I–IV.—General method*

The diethylene glycol or diethylene glycol-ethylene glycol mixture was added to the potassium chloride with agitation and an amount of water equal to one percent of this mixture was then stirred into the composition. Pellets (1.5 inches in diameter, approximately 1.5 inches in height) were formed from these mixtures using substantially the same pressure for each pellet, and the pellets were then heated in an oven at 165° F. for one hour. The dried pellets were then subjected to pressure and the breaking pressure was taken as an indication of the ability of the mixture to form a coherent cake. Low breaking pressures indicate good anti-caking properties, whereas high breaking pressures indicate poor anti-caking properties. Breaking pressures of about 130 p.s.i. are considered fair, breaking pressures of 80 p.s.i. are considered good and 60 p.s.i. and below excellent. The compositions tested and results obtained are recorded in Table 1.

TABLE 1

| Example Number | Anti-caking Chemical or Mixture | Concentration: Lbs. of Anti-caking Chemical/Ton of KCl+Chemical | Concentration: (Percent by Weight) | Breaking Pressure of Pellet (Lbs. Per Square Inch) |
|---|---|---|---|---|
| I | Diethylene glycol | 2.6<br>3.5<br>5.3<br>7.0 | .130<br>.175<br>.280<br>.350 | 131<br>100<br>50<br>65 |
| II | Ethylene glycol: diethylene glycol (1:19 parts by weight). | 2.6<br>3.5<br>5.3<br>7.0 | .130<br>.175<br>.280<br>.350 | 100<br>73<br>44<br>36 |
| III | Ethylene glycol: diethylene glycol (1:9 parts by weight). | 2.4<br>3.2<br>4.8<br>6.4 | .120<br>.170<br>.240<br>.320 | 101<br>79<br>61<br>50 |
| IV | Ethylene glycol: diethylene glycol (1:4 parts by weight). | 2.4<br>3.3<br>4.9<br>6.5 | .120<br>.165<br>.240<br>.325 | 100<br>90<br>65<br>53 |

The anti-caking additives of the invention have low volatility, no odor and are easily and safely applied to large commercial quantities of potassium chloride. After treatment, the resulting KCl compositions may be easily transferred in large quantities and remains essentially free-flowing during storage and shipment under widely varying conditions of temperature and humidity.

I claim as my invention:

1. A method of reducing the cake-forming tendency of potassium chloride which comprises contacting said potassium chloride with up to about four percent by weight of diethylene glycol.

2. The method of claim 1 wherein the potassium chloride is mixed with from about 0.05 to 0.5 percent by weight of diethylene glycol based upon the total weight of the treated composition.

3. The method of claim 2 wherein from 0.0075 percent to 0.08 percent of ethylene glycol based upon the total weight of the treated composition is incorporated therein.

4. A composition inhibited against moisture-induced caking which comprises potassium chloride and from about 0.05 to 0.5 percent by weight of diethylene glycol based upon the total weight of the potassium chloride and diethylene glycol.

5. A composition according to claim 4 which contains from 0.0075 to 0.08 percent by weight of ethylene glycol based upon the total weight of the potassium chloride diethylene glycol and ethylene glycol.

6. A composition inhibited against moisture-induced caking which comprises potassium chloride, from 0.15 to 0.35 percent by weight of diethylene glycol and from 0.0075 to 0.08 percent by weight of ethylene glycol based upon the total weight of the composition.

References Cited by the Examiner

UNITED STATES PATENTS

| | | | |
|---|---|---|---|
| 2,480,694 | 8/1949 | Atwood | 23—89 XR |
| 2,596,333 | 5/1952 | Halpern et al. | 117—100 |
| 2,734,002 | 2/1956 | Schoeld et al. | 117—100 |

MILTON WEISSMAN, *Primary Examiner.*

BENJAMIN HENKIN, *Examiner.*

E. STERN, *Assistant Examiner.*